United States Patent
Villa et al.

(10) Patent No.: US 9,041,533 B1
(45) Date of Patent: May 26, 2015

(54) AUTOMATIC PART MAPPING SYSTEM

(75) Inventors: Steve A. Villa, Auburn, WA (US); James O'Neil Wickline, Federal Way, WA (US); Dallas S. Scholes, Buckley, WA (US)

(73) Assignee: THE BOEING COMPANY, Chicago, IL (US)

(*) Notice: Subject to any disclaimer, the term of this patent is extended or adjusted under 35 U.S.C. 154(b) by 947 days.

(21) Appl. No.: 12/853,575

(22) Filed: Aug. 10, 2010

(51) Int. Cl.
G06F 17/00 (2006.01)
G01M 17/00 (2006.01)
G01S 11/02 (2010.01)
G01S 5/14 (2006.01)

(52) U.S. Cl.
CPC .. G01S 11/02 (2013.01); G01S 5/14 (2013.01)

(58) Field of Classification Search
CPC .............. G01S 11/02; G01S 2013/466; G01S 2013/462; G01S 2013/468; G01S 5/14; G01S 2013/46
See application file for complete search history.

(56) References Cited

U.S. PATENT DOCUMENTS

| | | | |
|---|---|---|---|
| 6,362,731 B1 * | 3/2002 | Lill | 340/445 |
| 6,496,806 B1 * | 12/2002 | Horwitz et al. | 705/28 |
| 6,600,418 B2 | 7/2003 | Sainati et al. | |
| 6,714,121 B1 | 3/2004 | Moore | |
| 6,888,462 B2 * | 5/2005 | Brodine | 340/568.1 |
| 6,956,538 B2 | 10/2005 | Moore | |
| 7,030,761 B2 | 4/2006 | Bridgelall et al. | |
| 7,042,346 B2 * | 5/2006 | Paulsen | 340/438 |
| 7,053,775 B2 | 5/2006 | Moore | |
| 7,219,834 B2 | 5/2007 | Chang | |
| 7,286,043 B2 * | 10/2007 | Carrender et al. | 340/10.42 |
| 7,286,835 B1 | 10/2007 | Dietrich et al. | |
| 7,400,268 B2 * | 7/2008 | Wilbrink et al. | 340/933 |
| 7,699,226 B2 * | 4/2010 | Smith et al. | 235/451 |
| 2003/0025598 A1 * | 2/2003 | Wolf et al. | 340/457.4 |
| 2006/0103534 A1 * | 5/2006 | Arms et al. | 340/572.1 |
| 2008/0284571 A1 * | 11/2008 | Wilbrink et al. | 340/10.1 |
| 2009/0234517 A1 * | 9/2009 | Feuillebois et al. | 701/3 |
| 2010/0134276 A1 * | 6/2010 | Zaruba et al. | 340/539.13 |
| 2010/0328048 A1 * | 12/2010 | Meli et al. | 340/10.42 |
| 2013/0003572 A1 * | 1/2013 | Kim et al. | 370/252 |
| 2013/0030931 A1 * | 1/2013 | Moshfeghi | 705/16 |

* cited by examiner

*Primary Examiner* — Benjamin C Lee
*Assistant Examiner* — Rajsheed Black-Childress
(74) *Attorney, Agent, or Firm* — Yee & Associates, P.C.

(57) ABSTRACT

A method, apparatus, and computer program product for identifying parts in a vehicle. Signals are received from a plurality of transponders associated with the parts in the vehicle. Locations of the parts are identified based on signal strengths for the signals received from the plurality of transponders and an identification of the parts in the signals.

17 Claims, 13 Drawing Sheets

SIGNAL DATA LOGGING TABLE

| TAG: | 2389 | 238E | 238A | 2388 | 238F | 238B | 4040 | 000C | 467 | 468 | 8443 | 13 |
|---|---|---|---|---|---|---|---|---|---|---|---|---|
| 1 | 68 | 64 | 64 | 63.2 | 57.6 | 68 | 54.4 | 52.8 | 54.4 | 56.8 | 56.8 | 57.6 |
| 2 | 65.6 | 65.6 | 67.2 | 65.6 | 66.4 | 70.4 | 57.6 | 56.8 | 57.4 | 58.4 | 56 | 57.6 |
| 3 | 64 | 70.4 | 68 | 70.4 | 65.6 | 64 | 58.4 | 57.6 | 57.2 | 60 | 58.4 | 58.4 |
| 4 | 66.4 | 70.4 | 67.2 | 69.6 | 71.2 | 66.4 | 60 | 60.4 | 62.4 | 63.1 | 57 | 57.6 |
| 5 | 68 | 72.8 | 66.4 | 60.8 | 76 | 64.8 | 60 | 57.6 | 65.6 | 67.6 | 59.4 | 60.2 |
| 6 | 70.4 | 84.8 | 66.4 | 59.2 | 88 | 64.8 | 60 | 58.4 | 73.6 | 73.6 | 59 | 59.2 |
| 7 | 65.6 | 70.4 | 64.8 | 68 | 70.4 | 64 | 57.8 | 57.6 | 60 | 60 | 52 | 53.6 |
| 8 | 70.4 | 70.4 | 62.4 | 70.4 | 69.6 | 57.6 | 61.2 | 60.8 | 59.2 | 61.6 | 56 | 57.6 |
| 9 | 70.4 | 67.2 | 59.2 | 68 | 68.8 | 58.4 | 59.2 | 61.4 | 57.2 | 60.8 | 56.8 | 56 |
| 10 | 72.8 | 64.8 | 64.8 | 72 | 66 | 61.6 | 64.8 | 60.8 | 59.2 | 57.6 | 53.4 | 56.8 |
| 11 | 88 | 64.8 | 66 | 88 | 62.4 | 61 | 74.4 | 74.4 | 56.8 | 59.2 | 56 | 53.6 |
| 12 | 70.4 | 62.4 | 66.4 | 71.2 | 60.8 | 62.4 | 62 | 60.8 | 55.2 | 54.4 | 52 | 55 |
| 13 | 64 | 68.4 | 68 | 65.6 | 68.8 | 68.8 | 58.4 | 56.8 | 59.2 | 59.2 | 55.2 | 60.4 |
| 14 | 66.8 | 68 | 70.4 | 60.8 | 71.2 | 71.2 | 55 | 54.4 | 58.4 | 59.2 | 60.2 | 60 |
| 15 | 65.6 | 65.6 | 70.4 | 64.8 | 67.2 | 73.6 | 58 | 57.6 | 59.4 | 58.4 | 61.4 | 61.2 |
| 16 | 67.2 | 64 | 76.2 | 59.2 | 63.2 | 89.6 | 55.2 | 53.6 | 54.4 | 58.8 | 64.8 | 64.8 |
| 17 | 64.8 | 67.6 | 88.8 | 64 | 65.6 | 89.6 | 57.6 | 54.4 | 56.8 | 60 | 74.4 | 74.4 |
| 18 | 68 | 64 | 72.8 | 68.8 | 64 | 70.4 | 56 | 54.4 | 57.6 | 57.6 | 62.4 | 63 |

FIG. 7

| TAG INFORMATION TABLE ||
| --- | --- |
| TAG IDENTIFICATION | PART NUMBER |
| 2389 | 1001 |
| 238E | 2002 |
| 238A | 3003 |
| 2388 | B123 |
| 238F | B123 |
| 238B | B123 |
| 4040 | C234 |
| 000C | C345 |
| 467 | C234 |
| 468 | C345 |
| 8443 | C234 |
| 13 | C345 |

FIG. 8

| PART ASSOCIATION TABLE 900 | |
|---|---|
| PART NUMBER | HIGHER LEVEL ASSEMBLIES |
| 906 — TR787 | |
| 908 — 1001 | TR787 |
| 914 — B123 | 1001 |
| C234 | 1001 |
| C345 | 1001 |
| 910 — 2002 | TR787 |
| 916 — B123 | 2002 |
| C234 | 2002 |
| C345 | 2002 |
| 912 — 3003 | TR787 |
| 918 — B123 | 3003 |
| C234 | 3003 |
| C345 | 3003 |

902    FIG. 9    904

CONFIGURATION TABLE

| TAG IDENTIFICATION | PART NUMBER | HIGHER LEVEL ASSEMBLIES NUMBER | NEARNESS INDICES |
|---|---|---|---|
| 2389 | 1001 | TR787 | 999 |
| 238E | 2002 | TR787 | 999 |
| 238A | 3003 | TR787 | 999 |
| 2388 | B123 | 1001 | 9.15 |
| 238F | B123 | 2002 | 26.2 |
| 238B | B123 | 3003 | 13.1 |
| 4040 | C234 | 1001 | 10 |
| 000C | C345 | 1001 | 12.2 |
| 467 | C234 | 2002 | 19.9 |
| 468 | C345 | 2002 | 22.4 |
| 8443 | C234 | 3003 | 11 |
| 13 | C345 | 3003 | 12 |

FIG. 11

AUTOMATIC PART MAPPING SYSTEM

BACKGROUND INFORMATION

1. Field

The present disclosure relates generally to vehicles and, in particular, to identifying the location of parts in a vehicle. Still more particularly, the present disclosure relates to a method and apparatus for mapping parts in a vehicle using radio frequency identifiers.

2. Background

Vehicles require maintenance after some period of time during which the vehicle is used. For example, aircraft may be taken out of service for scheduled maintenance to replace parts that wear out or to perform inspections to see if other maintenance needs to be performed on the aircraft. During maintenance of an aircraft, a part or assembly of parts may be overhauled, repaired, inspected, and/or modified. Examples of maintenance that may be performed on an aircraft include, for example, without limitation, replacing tires, replacing seals, replacing actuators, changing the configuration of the seats, and other suitable operations.

In performing maintenance, a part may be removed from the aircraft. The part may then be inspected, reworked, or replaced. The part is then reinstalled in the aircraft. If multiple parts of the same type are removed, these parts may be returned to the aircraft in different locations from where they were removed. In some cases, parts are fungible. In other words, these parts are not specifically designed or selected for a particular location. As a result, if multiple parts of the same type are removed from the aircraft, maintenance personnel may not know where the parts came from.

If reworking or replacement of a part occurs, it may be desirable to identify the original location of the part. The original location of the part may be used to determine whether the particular assembly in which the part was used may require further maintenance.

Further, this identification of the original location of the part may currently be performed by a maintenance person marking each part and the location from which each part was removed from the aircraft. This type of process, however, is time consuming and may increase the time and expense for performing maintenance on an aircraft.

Therefore, it would be advantageous to have a method and apparatus that takes into account at least some of the issues discussed above, as well as possibly other issues.

SUMMARY

In one advantageous embodiment, a method is provided for identifying parts in a vehicle. Signals are received from a plurality of transponders associated with the parts in the vehicle. Locations of the parts are identified based on signal strengths for the signals received from the plurality of transponders and an identification of the parts in the signals.

In another advantageous embodiment, an apparatus comprises a storage device, program code stored in the storage device, and a processor unit configured to run the program code. The processor unit is configured to run the program code to receive signals from a plurality of transponders associated with parts in a vehicle. The processor unit is configured to run the program code to identify locations of the parts based on signal strengths for the signals received from the plurality of transponders and an identification of the parts in the signals.

In yet another advantageous embodiment, a computer program product for identifying parts in a vehicle comprises a computer readable storage medium and program code, stored on the computer readable storage medium. Program code is present for receiving signals from a plurality of transponders associated with the parts in the vehicle. Program code is present for identifying locations of the parts based on signal strengths for the signals received from the plurality of transponders and an identification of the parts in the signals.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a signal data logging table in accordance with an advantageous embodiment;

FIG. 8 is an illustration of a tag information table in accordance with an advantageous embodiment;

FIG. 9 is an illustration of a part association table in accordance with an advantageous embodiment;

FIG. 11 is an illustration of a configuration table in accordance with an advantageous embodiment;

DETAILED DESCRIPTION

Figure 1:
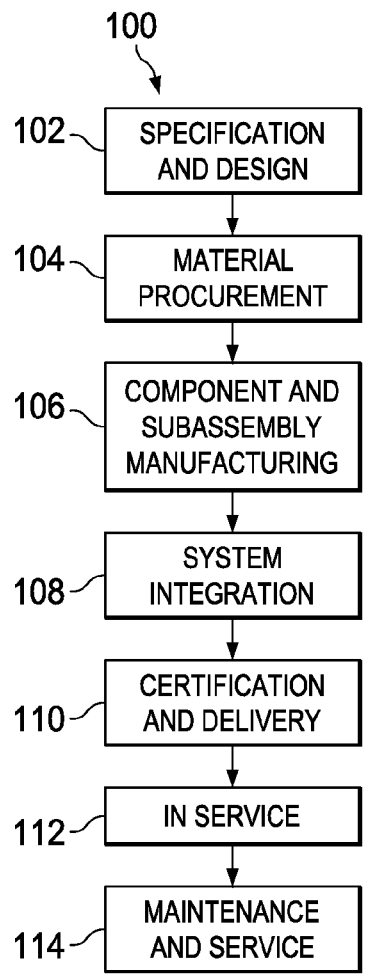
FIG. 1 is an illustration of an aircraft manufacturing and service method in accordance with an advantageous embodiment.
Figure 2:
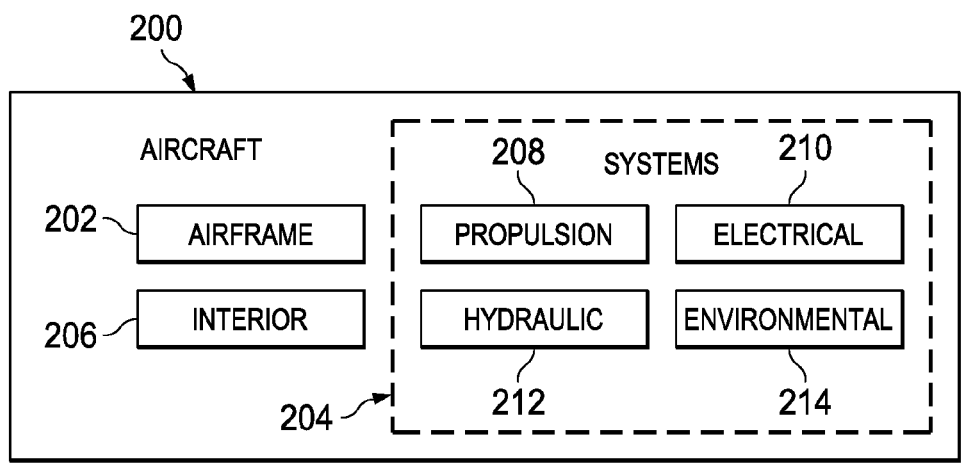
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment.

During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, the different advantageous embodiments recognize and take into account that it may be desirable to identify the location from which parts have been removed and the locations to where the parts are returned. For example, if a part requires replacement, currently, the part is removed and information about the part is recorded. This part, however, may have duplicates throughout the same vehicle.

One example is an actuator for a defueling valve. An actuator for a defueling value may be located on a left wing and a right wing of the aircraft. If this valve is replaced, currently, the different advantageous embodiments recognize and take into account that information is not present to indicate a history of replacements. For example, if the actuator for a defueling valve on the left wing was replaced more often than the actuator on the right wing, data is unavailable for this situation.

The different advantageous embodiments recognize and take into account that the design and function of the actuator may not be the cause of the need for replacement. Instead, the different advantageous embodiments recognize and take into account that the cause for the replacement may be from the design of the system in which the actuator is located.

Thus, the different advantageous embodiments recognize and take into account that it would be advantageous to record the location from which parts were removed. Further, the different advantageous embodiments recognize and take into account that it would be advantageous to be able to identify history of maintenance for parts in different locations of the aircraft. This information may provide an ability to analyze the systems in which the parts are located to determine whether changes are needed.

Thus, the different advantageous embodiments provide a method and apparatus for identifying parts in a vehicle. In particular, the different advantageous embodiments provide a method and apparatus for identifying locations of parts in a vehicle. This identification is a unique identification such that when removed, a particular part can be identified as being from a particular location in the vehicle.

In one advantageous embodiment, signals from a plurality of transponders associated with the parts in the vehicle are received. The locations of parts identified are based on the signal strengths for the signals received from the plurality of transponders and an identification of the parts in the signals.

Figure 3:
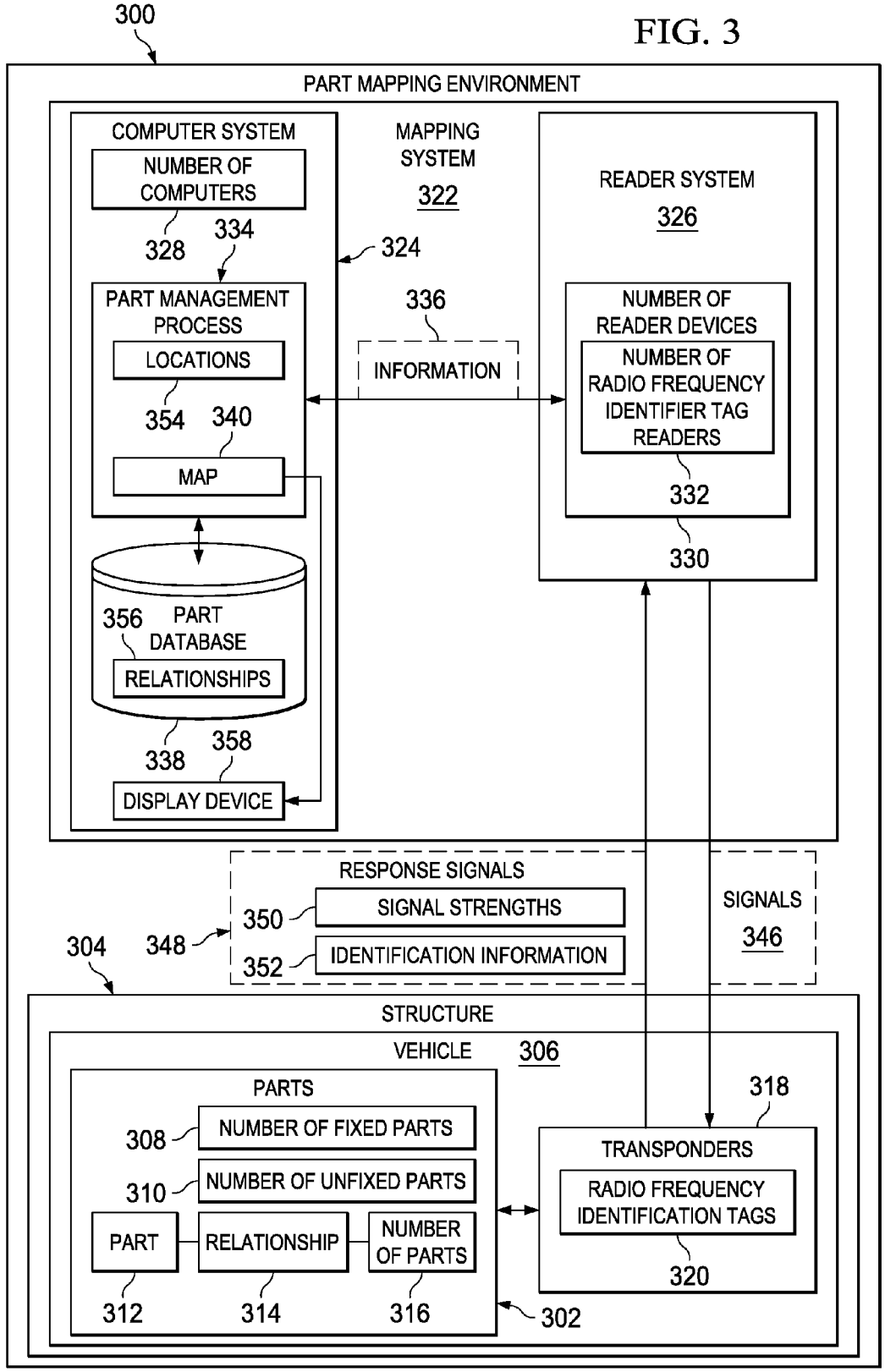
FIG. 3 is an illustration of a part mapping environment in accordance with an advantageous embodiment.

With reference now to FIG. 3, an illustration of a part mapping environment is depicted in accordance with an advantageous embodiment. Part mapping environment 300 is an example of an environment that may be used to map parts 302 in structure 304. In these illustrative examples, structure 304 takes the form of vehicle 306. In particular, vehicle 306 may be aircraft 200 in FIG. 2.

As depicted, parts 302 may include number of fixed parts 308 and number of unfixed parts 310. Number of fixed parts 308 may include any part that has a location that cannot be changed. In other words, a particular part in number of fixed parts 308 cannot be used in another location within vehicle 306.

Number of fixed parts 308 may be parts that are removable or may be parts that are not removable from vehicle 306. For example, a fixed part may be a flap for a particular horizontal stabilizer. Another example of a fixed part in number of fixed parts 308 may be the cabin of the aircraft, a fuselage, an engine, or some other part.

Further, number of fixed parts 308 also may include parts that make up other parts. For example, a fixed part may be an engine outlet, a portion of a cabin, a wing tip, or some other suitable type of fixed part.

Number of unfixed parts 310 may include any part that is usable in more than one location in an aircraft. For example, a defueling actuator may be used on either a right side defueling valve or a left side defueling valve for an aircraft.

Additionally, each part in parts 302 may have a relationship with other parts in parts 302. For example, part 312 may have relationship 314 with number of parts 316. This type of relationship may be present for each part in a vehicle. For example, part 312 may be a defueling actuator that is part of a defueling system. In particular, part 312 may be associated with a defueling valve. In these examples, when part 312 takes the form of a defueling actuator, part 312 may be an unfixed part. The defueling valve in number of parts 316 may be a fixed part.

Additionally, in the illustrative examples, transponders 318 may be associated with parts 302. A first component may be considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, transponders 318 may take a number of different forms. A transponder may be any device that is configured to detect an incoming wireless signal and generate a wireless signal in response to the incoming wireless signal. This wireless signal may include information, such as, for example, a unique identifier, information about an object, and/or other suitable types of information. In these illustrative examples, transponders 318 may be implemented using radio frequency identification tags 320.

Mapping system 322 comprises computer system 324 and reader system 326. Computer system 324 takes the form of number of computers 328. Number of computers 328 may be in communication with each other through wired and/or wireless connections in these illustrative examples.

Reader system 326 comprises number of reader devices 330. In particular, number of reader devices 330 may be any device that is configured to obtain information from transponders 318. In these illustrative examples, number of reader devices 330 may be implemented using number of radio frequency identifier tag readers 332.

Part management process 334 runs on computer system 324. Part management process 334 receives information 336 from number of reader devices 330. Information 336 is processed and stored in part database 338.

In these illustrative examples, part management process 334 also generates map 340 of parts 302. Map 340 may take a number of different forms. For example, map 340 may be a table describing parts and their locations. The locations may be in a coordinate system for vehicle 306. In other illustrative examples, map 340 may be a graphical representation of vehicle 306 with an identification of parts 302 and their locations in vehicle 306. For example, map 340 may be a model of vehicle 306 with indicators identifying locations of parts 302 in vehicle 306.

In these illustrative examples, reader system 326 generates signals 346. Signals 346 are received by one or more of transponders 318. Any transponders 318 in the range of signals 346 generate response signals 348 that may be read by reader system 326. Response signals 348 have signal strengths 350. Signal strengths 350 vary, depending on the locations of the transponders generating response signals 348 relative to the location of number of reader devices 330.

Additionally, response signals 348 also include identification information 352. Identification information 352 identifies the transponders in transponders 318 that generate response signals 348. Identification information 352 uniquely identifies each transponder.

In these illustrative examples, part management process 334 identifies locations 354 for parts 302 based on signal strengths 350 in response signals 348 received from transponders 318.

In these illustrative examples, number of reader devices 330 may be moved relative to vehicle 306 such that response signals 348 are received from all of parts 302 in vehicle 306. The receipt of response signals 348 may not occur all at the same time. Some response signals in response signals 348 may be received when number of reader devices 330 is in one location relative to vehicle 306. Additional response signals may be received as number of reader devices 330 are moved to other locations relative to vehicle 306.

In these illustrative examples, part management process 334 may identify locations 354 for parts 302 using signal strengths 350 and identification information 352. Additionally, signal strengths 350 between number of fixed parts 308 and number of unfixed parts 310 also may be compared to identify locations 354. Relationships 356 between parts in parts 302 and other parts in parts 302 may be found in part database 338 in these illustrative examples.

Map 340 for parts 302 in vehicle 306 may be generated as locations 354 are identified. By generating map 340, a new map may be generated or a prior map may be updated with locations 354. In these illustrative examples, map 340 may be displayed on display device 358 in computer system 324.

The illustration of part mapping environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, part management process 334 may run in number of reader devices 330. In yet other advantageous embodiments, mapping of parts 302 may occur for additional vehicles at the same time instead of just vehicle 306. Further, in other advantageous embodiments, vehicle 306 may be selected from one of a ground vehicle, an automobile, a truck, a bus, a train, a ship, a submarine, and a spacecraft instead of an aircraft.

Figure 4:
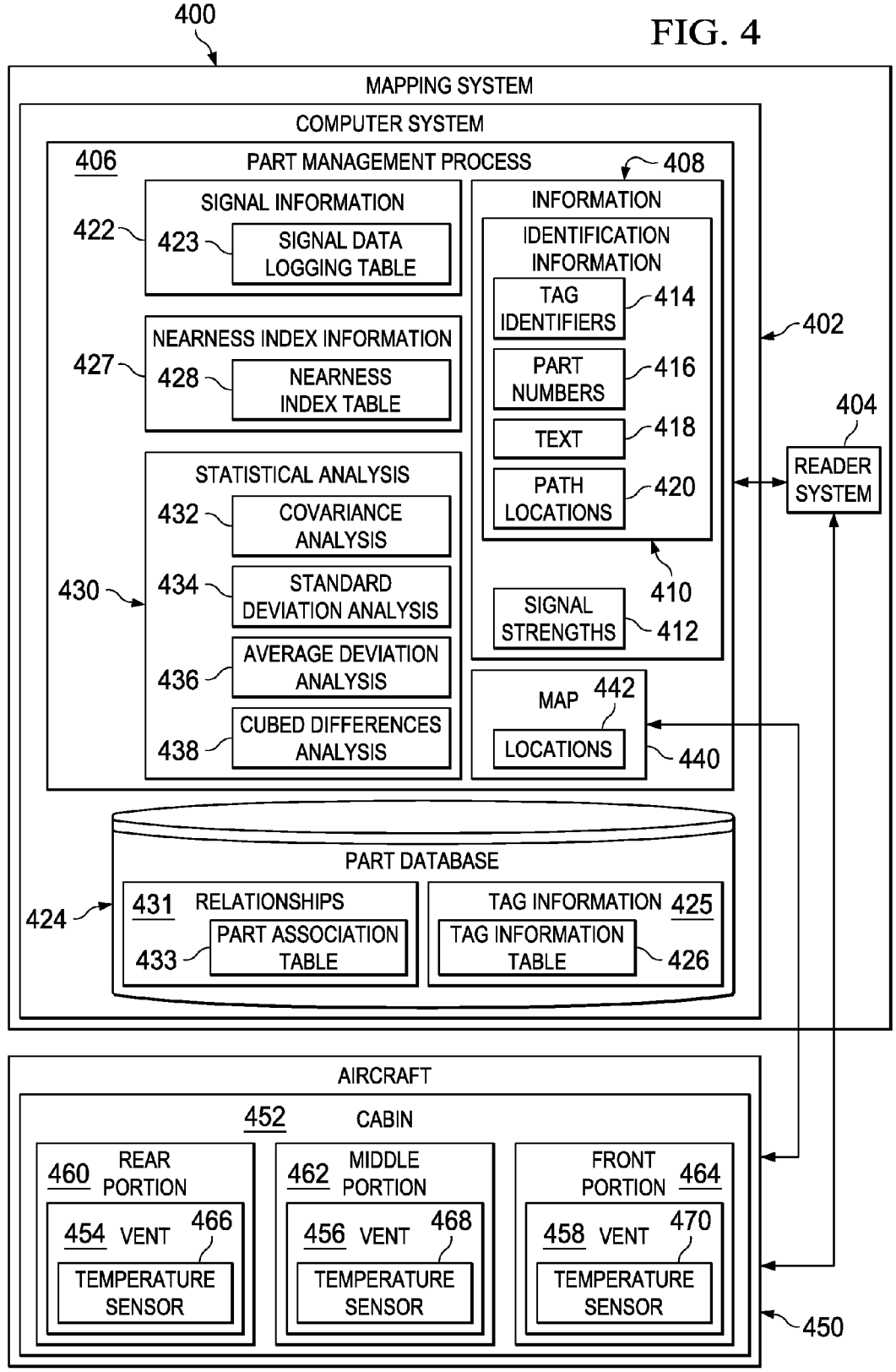
FIG. 4 is an illustration of a mapping system in accordance with an advantageous embodiment.

With reference now to FIG. 4, an illustration of a mapping system is depicted in accordance with an advantageous embodiment. In this illustrative example, mapping system 400 is an example of one implementation for mapping system 322 in FIG. 3. As depicted, mapping system 400 includes computer system 402 and reader system 404.

Part management process 406 runs on computer system 402. Part management process 406 receives information 408 from reader system 404. Information 408 includes identification information 410 for parts in a vehicle and signal strengths 412 of the signals received from radio frequency identifier tags associated with the parts.

Identification information 410 may include, for example, without limitation, tag identifiers 414, part numbers 416, text 418, path locations 420, and/or other suitable information. In this illustrative example, identification information 410 includes only tag identifiers 414 and path locations 420. Tag identifiers 414 are the identifiers for the radio frequency identifier tags associated with the parts in the vehicle. Path locations 420 are locations on a path around the vehicle along which reader system 404 was moved to collect information 408. In particular, path locations 420 are locations at which signals were received from the radio frequency identifier tags associated with the tag identifiers.

Part management process 406 generates signal information 422. In these illustrative examples, signal information 422 takes the form of signal data logging table 423. Signal data logging table 423 includes tag identifiers 414 and path locations 420. Signal data logging table 423 also identifies the signal strengths of the signals received at each path location for the tag identifiers.

In these depicted examples, tag information 425 is stored in part database 424. In other illustrative examples, tag information 425 may be stored in some other data structure. Tag information 425 takes the form of tag information table 426 in these examples. Tag information table 426 identifies the part number for the part associated with each tag identifier in tag identifiers 414. In these illustrative examples, each of tag identifiers 414 is unique. However, multiple tag identifiers may be associated with one part number. For example, multiple parts may have the same part number such that the tag identifier for each part is associated with the same part number.

In this illustrative example, part database 424 also includes relationships 431. Relationships 431 identify associations between, for example, parts and the higher level assemblies in which the parts are used. As one illustrative example, relationships 431 may be stored in the form of part association table 433. Part association table 433 associates part numbers for parts with the part numbers for the higher level assemblies in which the parts are used.

Part management process 406 may generate nearness index information 427 in the form of nearness index table 428 in these examples. Nearness index table 428 identifies a nearness index for each pair of tag identifiers in tag identifiers 414. Each pair of tag identifiers corresponds to a pair of parts in the vehicle.

The nearness index between a first and second tag identifier is a value that indicates how close a first part associated with the first tag identifier is to the second part associated with a second tag identifier. In other words, nearness index table 428 identifies how close the different parts in the vehicle are to each other.

The nearness index may be based on any type of scale. For example, a larger value for the nearness index may indicate a first part is closer to the second part. In other examples, a smaller value for the nearness index may indicate a first part is closer to the second part.

Nearness index information 427 may be generated using statistical analysis 430. Statistical analysis 430 is performed using signal information 422. In other words, nearness index information 427 is based on signal strengths 412 and path locations 420 identified in signal information 422.

Statistical analysis 430 may be selected from one of covariance analysis 432, standard deviation analysis 434, average deviation analysis 436, cubed differences analysis 438, and/or some other suitable type of statistical analysis.

In this illustrative example, part management process 406 uses nearness index information 427, tag information 425, and relationships 431 to generate map 440. Map 440 may be generated in the form of a table, a tree, a database, a diagram, or in some other suitable manner.

Map 440 identifies locations 442 for the parts in the vehicles. Locations 442 are identified based on the locations for fixed parts. For example, the nearness indices identified in nearness index information 427 are used to associate unfixed parts in the vehicle with fixed parts in the vehicle. These fixed parts have known locations in the vehicle. In this manner, the unfixed parts may be associated with the known locations for the fixed parts.

For example, without limitation, map 440 may be generated for identifying locations for parts within aircraft 450. Aircraft 450 has cabin 452 in this example. Vents 454, 456, and 458 are fixed parts located within cabin 452. These vents have known locations within cabin 452. For example, vent 454 is located in rear portion 460 of cabin 452. Vent 456 is located in middle portion 462 of cabin 452. Vent 458 is located in front portion 464 of cabin 452.

In this illustrative example, temperature sensor 466 is located in vent 454. Temperature sensor 468 is located in vent 456. Temperature sensor 470 is located in vent 458. These temperature sensors are unfixed parts within aircraft 450. Further, each of these temperature sensors has the same part number. Additionally, each of these temperature sensors is associated with a radio frequency identifier having a unique tag identifier.

Part management process 406 generates a number of nearness indices for the different pairs that may be formed between the tag identifiers associated with temperature sensor 466, temperature sensor 468, temperature sensor 470, vent 454, vent 456, and vent 458.

Based on these nearness indices, part management process 406 associates each temperature sensor with a vent in cabin 452. The known location of the vent is identified as the location for the temperature sensor in map 440. For example, temperature sensor 466 is identified as being in rear portion 460. Temperature sensor 468 is identified as being in middle portion 462. Temperature sensor 470 is identified as being in front portion 464.

Map 440 may be stored in part database 424 in these illustrative examples. Information 408 received at different points in time from reader system 404 may be used to update map 440 over time. In this manner, different locations for different parts may be tracked as parts are replaced, moved, and repaired.

Figure 5:
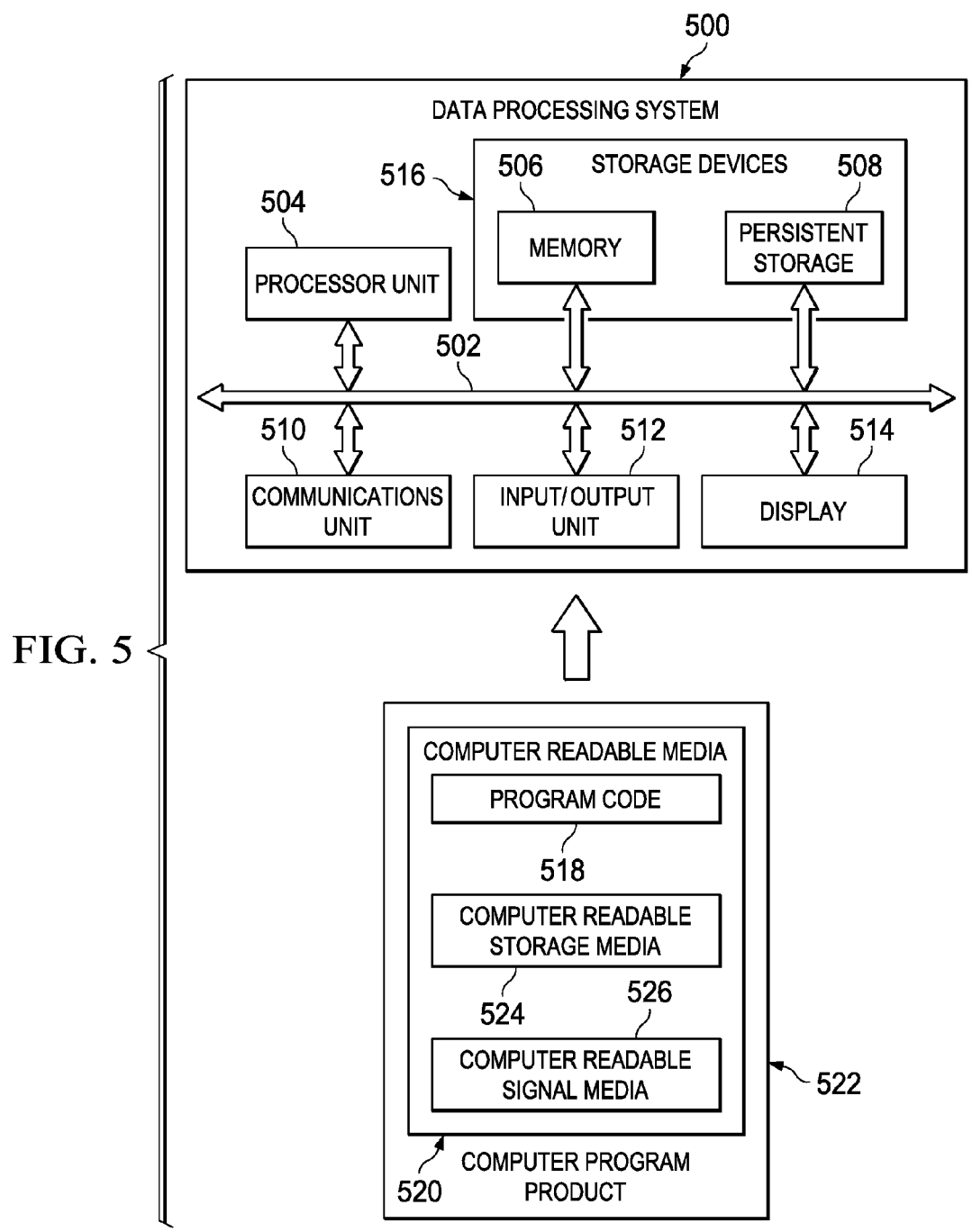
FIG. 5 is an illustration of a data processing system in accordance with an advantageous embodiment.

Turning now to FIG. 5, an illustration of a data processing system is depicted in accordance with an advantageous embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a number of processors, a multi-processor core, or some other type of processor, depending on the particular implementation. A number, as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples. In one example, computer readable media 520 may be computer readable storage media 524 or computer readable signal media 526. Computer readable storage media 524 may include, for example, an optical or magnetic disk that is inserted or placed into a drive or other device that is part of persistent storage 508 for transfer onto a storage device, such as a hard drive, that is part of persistent storage 508.

Computer readable storage media 524 also may take the form of a persistent storage, such as a hard drive, a thumb drive, or a flash memory, that is connected to data processing system 500. In some instances, computer readable storage media 524 may not be removable from data processing system 500. In these illustrative examples, computer readable storage media 524 is a non-transitory computer readable storage medium.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different advantageous embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 500 is any hardware apparatus that may store data. Memory 506, persistent storage 508, and computer readable media 520 are examples of storage devices in a tangible form.

In another example, a bus system may be used to implement communications fabric 502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 506, or a cache, such as found in an interface and memory controller hub that may be present in communications fabric 502.

Figure 6:
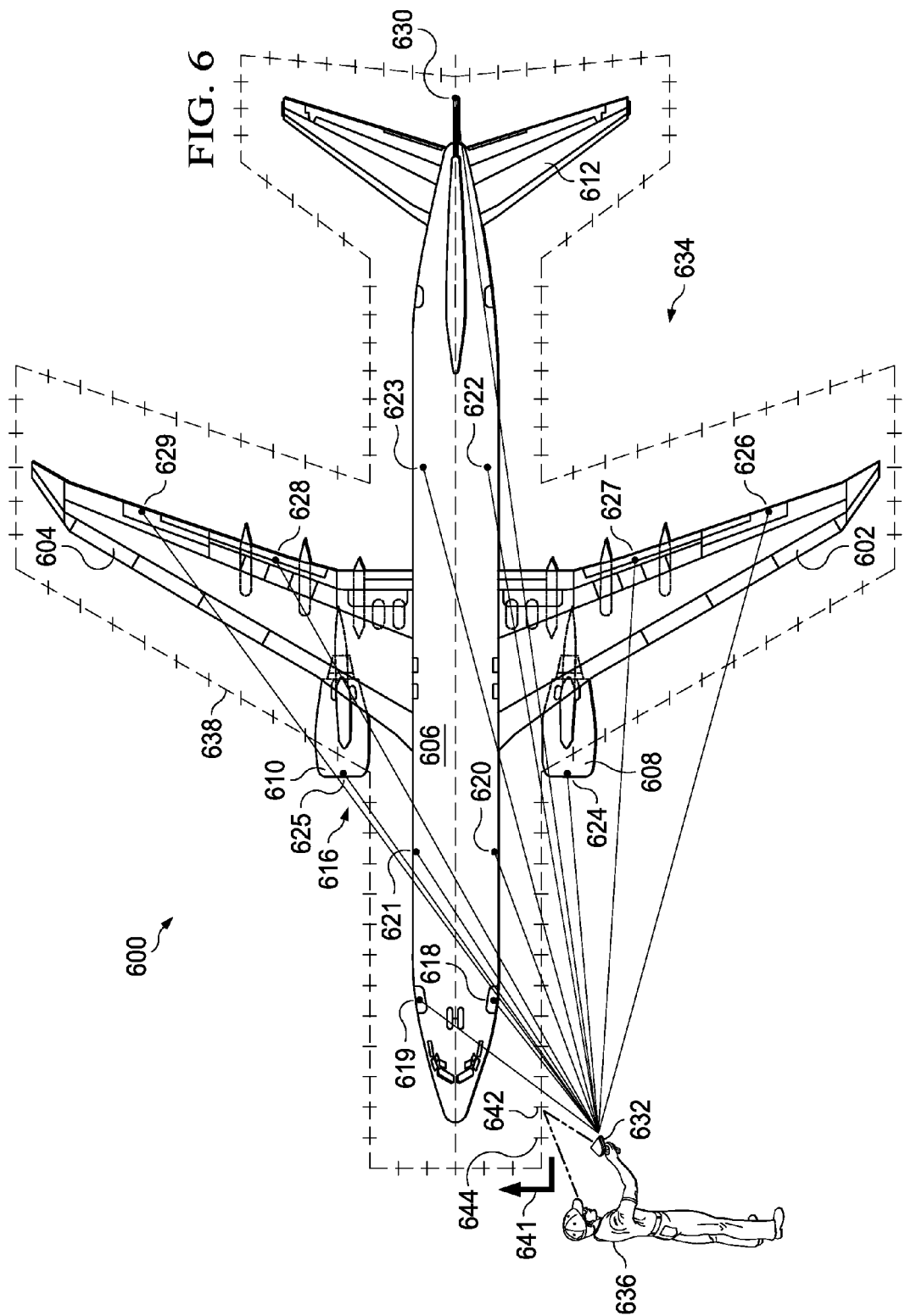
FIG. 6 is an illustration of a path around an aircraft for collecting information about the aircraft in accordance with an advantageous embodiment.

With reference now to FIG. 6, an illustration of a path around an aircraft for collecting information about the aircraft is depicted in accordance with an advantageous embodiment. In this illustrative example, aircraft 600 is an example of one implementation for aircraft 200 in FIG. 2 and vehicle 306 in FIG. 3. Aircraft 600 has wings 602 and 604 attached to body 606. Aircraft 600 includes wing-mounted engine 608, wing-mounted engine 610, and tail 612.

In this illustrative example, aircraft 600 has radio frequency identifier tags 616 associated with different parts in aircraft 600. For example, radio frequency identifier tags 616 include radio frequency identifier tags 618, 619, 620, 621, 622, 623, 624, 625, 626, 627, 628, 629, 630, and other radio frequency identifier tags (not shown).

Radio frequency identifier tags 618, 619, 620, 621, 622, and 623 are located in the interior of aircraft 600 in this illustrative example. Radio frequency identifier tags 624, 625, 626, 627, 628, 629, and 630 are located on the exterior of aircraft 600 in this example.

As depicted, user 636 may use reader system 632 to receive signals 634 from radio frequency identifier tags 616. Reader system 632 is an example of one implementation for reader system 326 in FIG. 3. User 636 may move reader system 632 along path 638 around aircraft 600 in the direction of arrow 641.

In this illustrative example, reader system 632 receives signals 634 at various points in time, while reader system 632 moves along path 638. In other words, reader system 632 samples signals 634 at various points in time, while user 636 moves reader system 632 along path 638. In this depicted example, reader system 632 samples signals 634 about every three seconds as user 636 moves reader system 632 along path 638.

For example, reader system 632 may sample signals 634 at path location 642, while reader system 632 moves along path 638. Reader system 632 may again sample signals 634 about three seconds after reader system 632 samples signals 634 at path location 644.

With reference now to FIG. 7, an illustration of a signal data logging table is depicted in accordance with an advantageous embodiment. In this illustrative example, signal data logging table 700 is an example of one implementation for signal data logging table 423 in FIG. 4.

As depicted, signal data logging table 700 includes tag identifiers 702 and sample points 704. Tag identifiers 702 are the unique identifiers for radio frequency identifier tags. Each sample point in sample points 704 corresponds to a particular point in time at which the signals from the radio frequency identifier tags were sampled and received. In some illustrative examples, sample points 704 may correspond to particular path locations identified along a path.

Signal strengths 706 identify the signal strengths for the signals from the radio frequency identifier tags received at the different points in time. In this illustrative example, a larger value for signal strengths 706 indicates higher signal strength. Similarly, a smaller value for signal strengths 706 indicates lower signal strength.

As one illustrative example, entry 708 has a value that is larger than the value for entry 710 in signal data logging table 700. In other words, a signal received from the radio frequency identifier with tag identifier 238A has a higher signal strength at sample point 712 as compared to sample point 714.

In some illustrative examples, an entry in signal strengths 706 may be blank. A blank entry may indicate that a signal for the particular tag identifier at the particular path location was not received. For example, a signal may not be received for a tag identifier that is out of range for the reader system.

With reference now to FIG. 8, an illustration of a tag information table is depicted in accordance with an advantageous embodiment. In this illustrative example, tag information table 800 is an example of one implementation for tag information table 426 in FIG. 4.

Tag information table 800 includes tag identifiers 802 and part numbers 804. Tag identifiers 802 include the same tag identifiers in tag identifiers 702 in FIG. 7. Tag information table 800 associates tag identifiers 802 with part numbers 804. As depicted in this example, more than one unique tag identifier in tag identifiers 802 may be associated with the same part number. For example, tag identifier 806 and tag identifier 808 both have the same part number.

With reference now to FIG. 9, an illustration of a part association table is depicted in accordance with an advantageous embodiment. In this illustrative example, part association table 900 is an example of one implementation for part association table 433 in part database 424 in FIG. 4. Part association table 900 contains information that may be used to generate a map, such as map 440 in FIG. 4.

As depicted, part association table 900 includes part number 902 and higher level assembly 904. A higher level assembly is a fixed part having a known location in these examples. Further, a higher level assembly, in these examples, may be comprised of a number of other parts. Part association table 900 identifies in which higher level assembly parts are used.

For example, part 906 is an aircraft. In this illustrative example, the aircraft is the highest level assembly. Part 908, part 910, and part 912 are used in part TR787. Part 906, part 908, part 910, and part 912 are fixed parts located in the aircraft in this illustrative example.

As depicted, part 914, part 916, and part 918 each have part number B123. These parts are associated with part 908, part 910, and part 912, respectively. However, without identifying a unique identifier for each of parts 914, 916, and 918, these parts may not be able to be distinguished from each other for use in the higher level assemblies.

Figure 10:
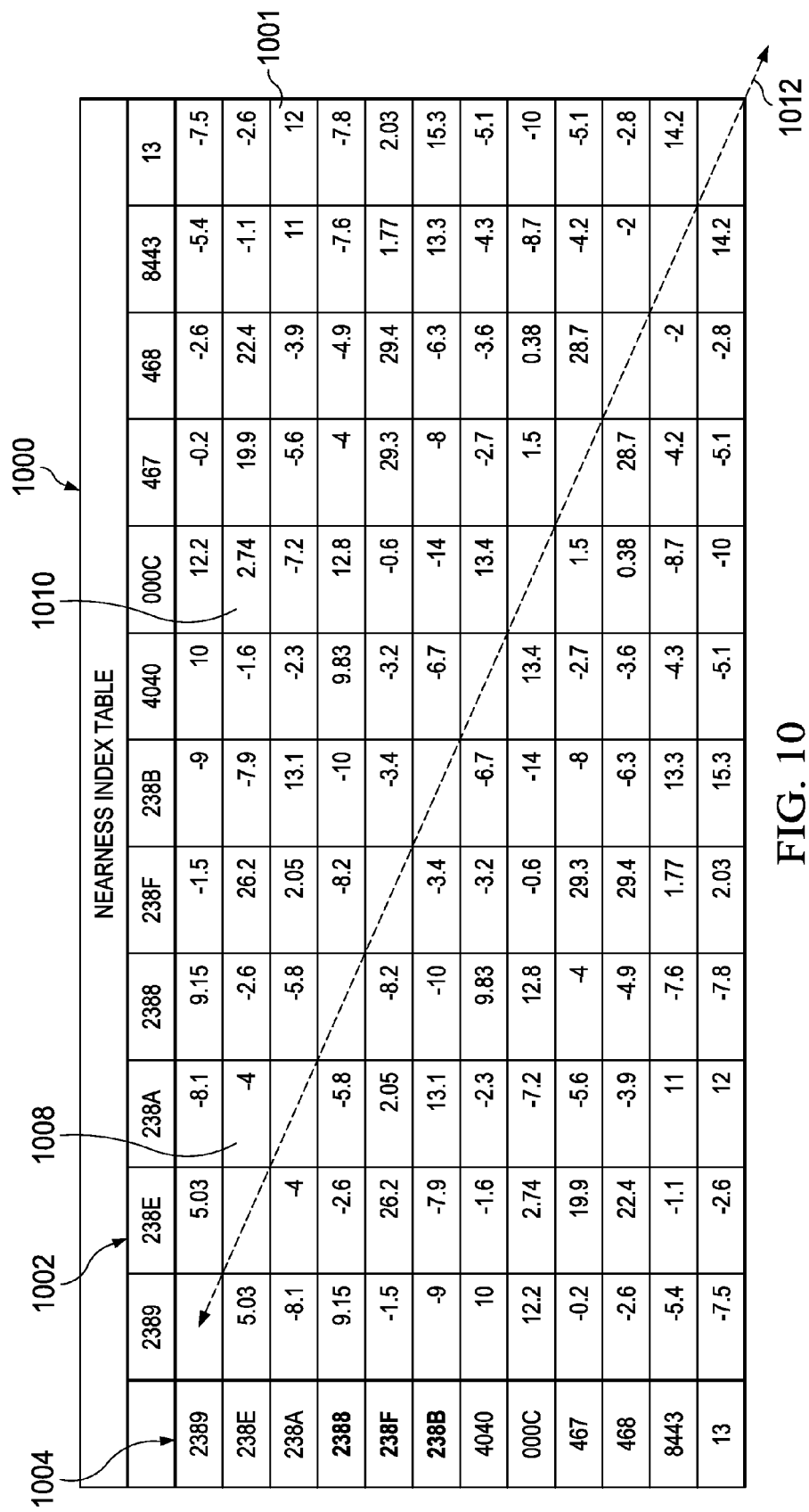
FIG. 10 is an illustration of a nearness index table in accordance with an advantageous embodiment.

With reference now to FIG. 10, an illustration of a nearness index table is depicted in accordance with an advantageous embodiment. In this illustrative example, nearness index table 1000 is an example of one implementation for nearness index table 428 in FIG. 4.

Nearness index table 1000 identifies nearness indices 1001 for all of the different pairs of tag identifiers 1002 and tag identifiers 1004. Tag identifiers 1002 and tag identifiers 1004 are the same tag identifiers. In other words, tag identifiers 1002 and tag identifiers 1004 include the same list of tag identifiers. The tag identifiers are the same as tag identifiers 802 in FIG. 8 and tag identifiers 702 in FIG. 7.

In this illustrative example, a larger value for the nearness index indicates that the two parts associated with the particular pair of tag identifiers are closer, as compared to a smaller value for the nearness index. For example, nearness index 1008 and nearness index 1010 indicate that the part associated with tag identifier 238E is not as close to the part associated with tag identifier 238A as compared to the part associated with tag identifier 000C. As depicted, no nearness indices are produced for the table entries along diagonal line 1012.

With reference now to FIG. 11, an illustration of a configuration table is depicted in accordance with an advantageous embodiment. In this illustrative example, configuration table 1100 contains information that may be used to generate a map, such as map 440 in FIG. 4.

Configuration table 1100 includes tag identifiers 1102, part numbers 1104, higher level assemblies 1106, and nearness indices 1108. Tag identifiers 1102 are associated with part numbers 1104, higher level assemblies 1106, and nearness indices 1108. Tag identifiers 1102 are the same tag identifiers as tag identifiers 802 in FIG. 8. Part numbers 1104 are the same part numbers as part numbers 804 in FIG. 8.

In this illustrative example, higher level assemblies 1106 may be associated with tag identifiers 1102 by part management process 406 in FIG. 4. A higher level assembly is a fixed part having a known location in these examples. Further, a higher level assembly, in these examples, is comprised of a number of other parts.

The part management process associates each tag identifier with a higher level assembly using the information provided in nearness index table 1000 in FIG. 10, in tag information table 800 in FIG. 8, and in part association table 900 in FIG. 9. As depicted, more than one tag identifier may be associated with the same higher level assembly.

Figure 12:
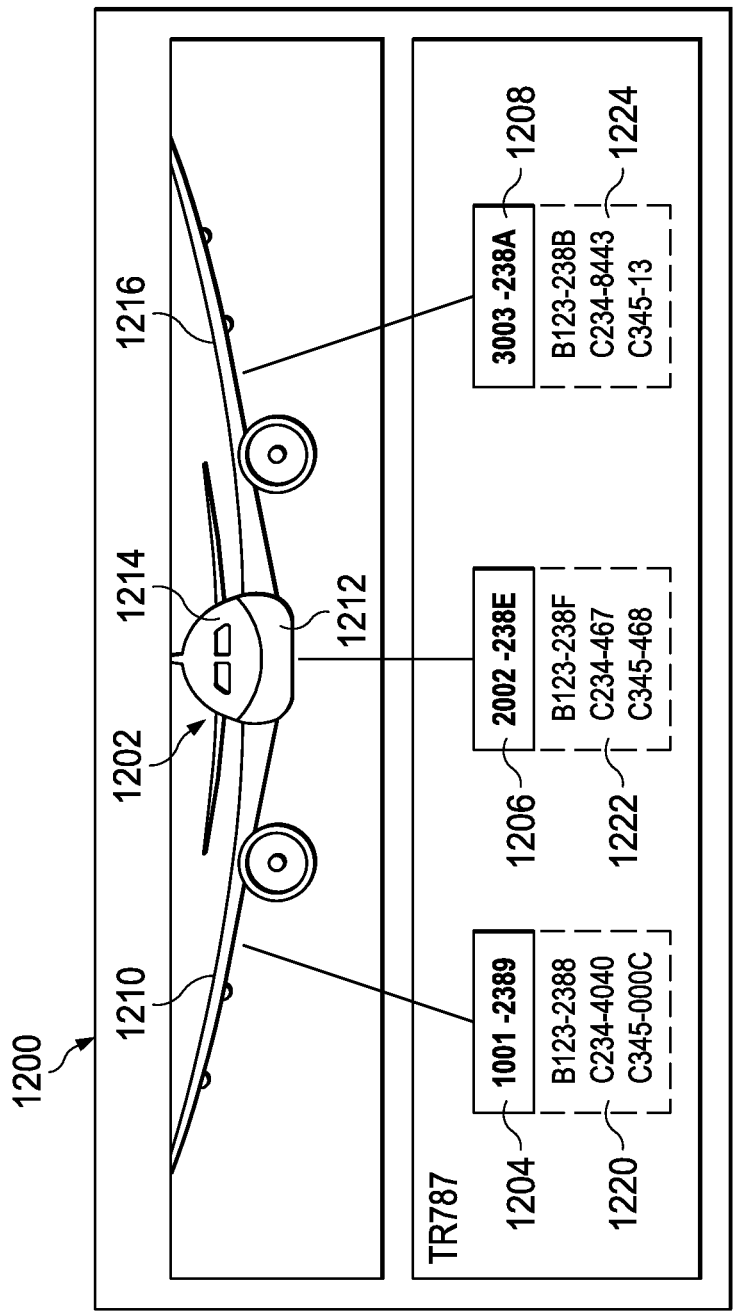
FIG. 12 is an illustration of a map in accordance with an advantageous embodiment.

With reference now to FIG. 12, an illustration of a map is depicted in accordance with an advantageous embodiment. In this illustrative example, map 1200 is an example of one implementation for map 440 in FIG. 4. As depicted, map 1200 identifies locations for parts in aircraft 1202. Aircraft 1202 is identified as higher level assembly TR787 in this example.

In this illustrative example, map 1200 may be generated using configuration table 1100 in FIG. 11 and known locations for the higher level assemblies in higher level assemblies 1106 in FIG. 11. First higher level assembly 1204, second higher level assembly 1206, and third higher level assembly 1208 are associated with aircraft 1202 in this example. Further, first higher level assembly 1204 is located in first wing 1210 of aircraft 1202. Second higher level assembly 1206 is located on bottom 1212 of fuselage 1214 of aircraft 1202. Third higher level assembly 1208 is located in second wing 1216 of aircraft 1202.

Additionally, first group of parts 1220 is associated with first higher level assembly 1204. Second group of parts 1222 is associated with second higher level assembly 1206. Third group of parts 1224 is associated with third higher level assembly 1208. As a result, first group of parts 1220 are in first wing 1210. Second group of parts 1222 are on bottom 1212 of fuselage 1214. Third group of parts 1224 are in second wing 1216.

Figure 13:
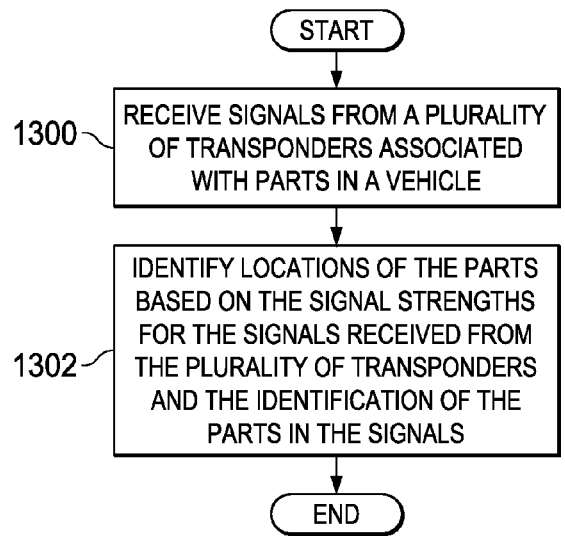
FIG. 13 is an illustration of a flowchart of a process for identifying parts in a vehicle in accordance with an advantageous embodiment.

With reference now to FIG. 13, an illustration of a flowchart of a process for identifying parts in a vehicle is depicted in accordance with an advantageous embodiment. The process illustrated in FIG. 13 may be implemented in part mapping environment 300 in FIG. 3. Further, this process may be implemented using mapping system 322 in FIG. 3 and/or mapping system 400 in FIG. 4.

The process begins by receiving signals from a plurality of transponders associated with parts in a vehicle (operation 1300). The signals contain information. This information includes signal strengths for the signals and identification information for the parts.

Thereafter, the process identifies locations of the parts based on the signal strengths for the signals received from the plurality of transponders and the identification of the parts in the signals (operation 1302), with the process terminating thereafter.

Figure 14:
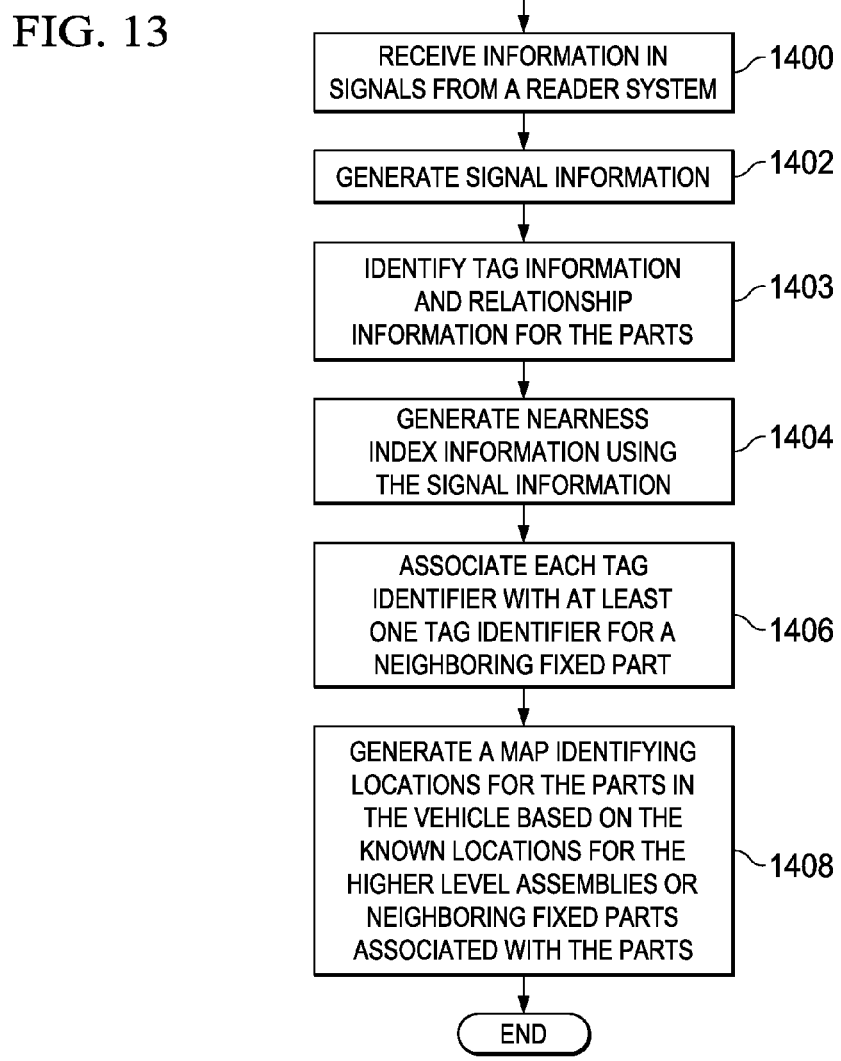
FIG. 14 is an illustration of a flowchart of a process for generating a map in accordance with an advantageous embodiment.

With reference now to FIG. 14, an illustration of a flowchart of a process for generating a map is depicted in accordance with an advantageous embodiment. The process illustrated in FIG. 14 may be implemented using mapping system 322 in FIG. 3 and/or mapping system 400 in FIG. 4. Further, this process is a more detailed process for the process illustrated in FIG. 13.

The process begins by receiving information in signals from a reader system (operation 1400). The reader system may be, for example, reader system 326 in FIG. 3. The information received includes tag identifiers for each radio frequency identifier tag associated with a part in a vehicle.

Further, this information includes an indication of signal strength for the signals received. This indication may be referred to as a received signal strength indication (RSSI).

Thereafter, the process generates signal information (operation 1402). The signal information may be generated in the form of a signal data logging table, such as signal data logging table 423 in FIG. 4 and/or signal data logging table 700 in FIG. 7.

The process then identifies tag information and relationship information for the parts (operation 1403). The tag information may be in the form of a tag information table, such as tag information table 426 in FIG. 4 and/or tag information table 800 in FIG. 8. The relationship information may be in the form of a part association table, such as part association table 433 in FIG. 4 and/or part association table 900 in FIG. 9.

Then, the process generates nearness index information using the signal information (operation 1404). The nearness index information may be generated in the form of a nearness index table, such as nearness index table 428 in FIG. 4 and/or nearness index table 1000 in FIG. 10.

Next, the process associates each tag identifier with at least one tag identifier for a neighboring fixed part (operation 1406). Operation 1406 may be performed using the nearness index information generated in operation 1404. In operation 1406, this association associates the higher level assembly with the part associated with the tag identifier. In some illustrative examples, a nearest neighbor may be associated with each tag identifier in operation 1406 instead of a higher level assembly. The nearest neighbor of a first part is the closest part to the first part based on the nearness index.

Thereafter, the process generates a map identifying locations for the parts in the vehicle based on the known locations for the higher level assemblies or neighboring fixed parts associated with the parts (operation 1408), with the process terminating thereafter. The map may take the form of a table, a tree, a diagram, a combination of a table and an illustration, or some other suitable form.

Figure 15:
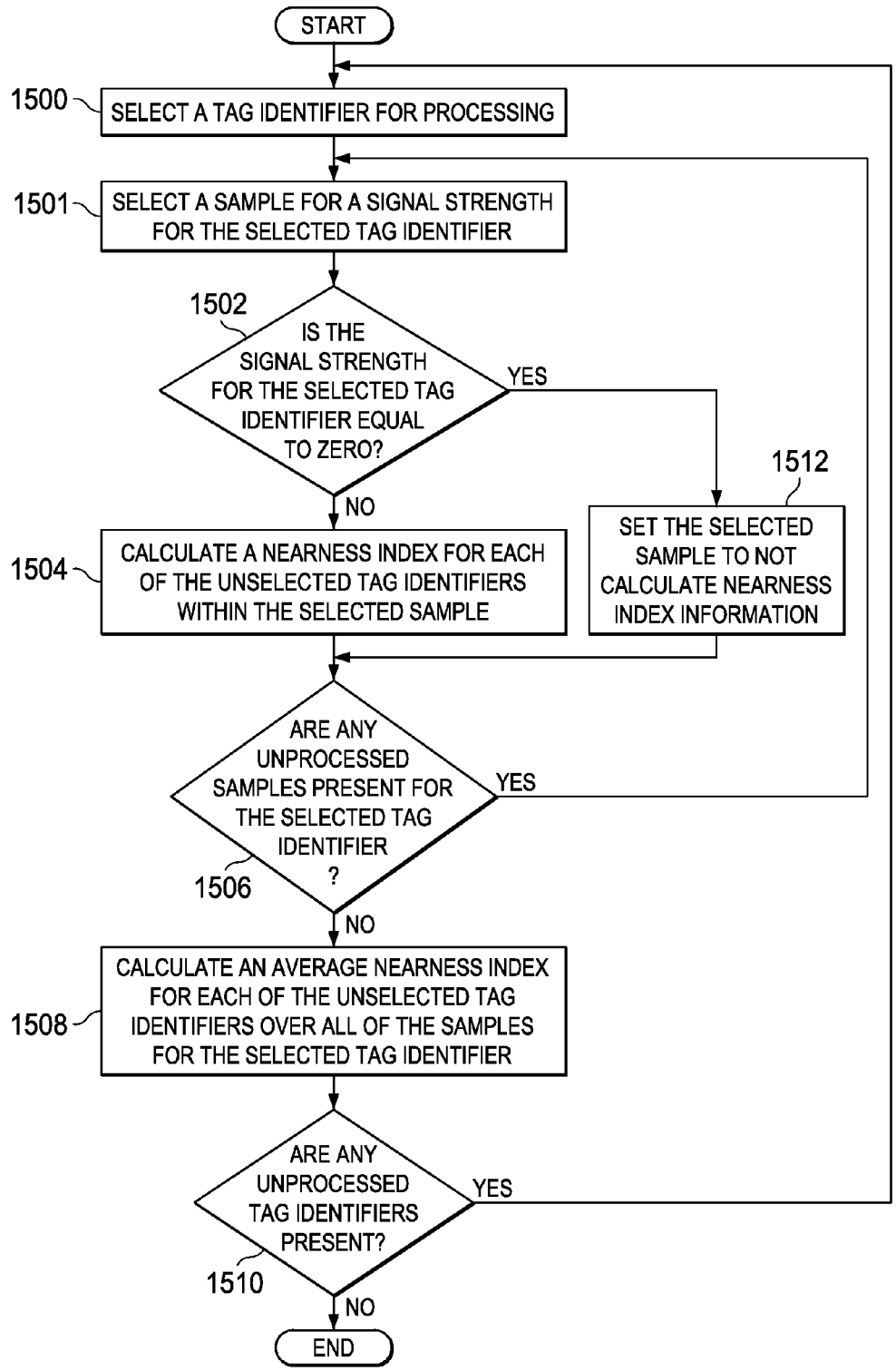
FIG. 15 is an illustration of a flowchart of a process for generating nearness index information in accordance with an advantageous embodiment.

With reference now to FIG. 15, an illustration of a flowchart of a process for generating nearness index information is depicted in accordance with an advantageous embodiment. The process illustrated in FIG. 15 may be implemented using mapping system 322 in FIG. 3 and/or mapping system 400 in FIG. 4. This process is a more detailed process for operation 1404 in FIG. 14.

The process begins by selecting a tag identifier for processing (operation 1500). In this illustrative example, the tag identifier selected is the selected tag identifier, and the tag identifiers not selected are the unselected tag identifiers.

A sample for a signal strength for the selected tag identifier is then selected (operation 1501). The sample may be selected from an entry in a signal data logging table, such as signal data logging table 423 in FIG. 4 and/or signal data logging table 700 in FIG. 7.

A determination is made as to whether signal strength for the selected tag identifier is equal to zero (operation 1502). If the selected tag identifier has a signal strength that is not equal to zero, a nearness index is calculated for each of the unselected tag identifiers within the selected sample (operation 1504).

Thereafter, a determination is made as to whether any unprocessed samples are present for the selected tag identifier (operation 1506). If any unprocessed samples are present, the process returns to operation 1501 as described above. Otherwise, if unprocessed samples are not present, an average nearness index is calculated for each of the unselected tag identifiers over all of the samples for the selected tag identifier (operation 1508). In other illustrative examples, a different statistical calculation may be performed using the nearness index for each of the unselected tag identifiers in operation 1508.

Next, the process determines whether any unprocessed tag identifiers are present (operation 1510). If unprocessed tag identifiers are not present, the process terminates. Otherwise, the process returns to operation 1500 as described above.

With reference again to operation 1502, if the selected tag identifier has a signal strength equal to zero, the process sets the selected sample to not calculate nearness index information (operation 1512). The process then proceeds to operation 1506 as describe above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for identifying parts in a vehicle. In particular, the different advantageous embodiments provide a method and apparatus for identifying locations of parts in a vehicle. This identification is a unique identification such that when removed, a particular part can be identified as being from a particular location in the vehicle.

In one advantageous embodiment, signals from a plurality of transponders associated with the parts in the vehicle are received. The locations of parts identified are based on the signal strengths for the signals received from the plurality of transponders and an identification of the parts in the signals.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying parts in a vehicle, the method comprising:
receiving signals by a reader positioned at a number of locations on a path relative to the vehicle from a plurality of transponders associated with the parts in the vehicle, the parts including a number of fixed parts and a number of unfixed parts with respect to the vehicle, the number of fixed parts including any part that has a location that cannot be changed in the vehicle and the number of unfixed parts including any part that is usable in more than one location in the vehicle;
identifying the parts from the identification of the parts in the signals;
creating a number of associations between each of said parts and a higher level assembly in which the part is used, the higher level assembly comprises a plurality of fixed parts having a known location;
determining nearness index information between transponders to associate an unfixed part with a fixed part using signal strengths of said received signals; and
forming a map of the parts using a number of locations identified for the parts by identifying the known locations for the number of fixed parts and determining the locations for the number of unfixed parts, wherein the location of each of the unfixed parts is determined based upon a known location of a fixed part, said created number of associations, and said nearness index information associating an unfixed part with a fixed part.

2. The method of claim 1 further comprising:
displaying the map of the parts on a display device.

3. The method of claim 1 further comprising:
responsive to a removal of a part from a location in the vehicle, recording the removal of the part and the location using the locations identified for the parts.

4. The method of claim 1 further comprising:
responsive to placing a part in the vehicle, identifying a location of the part in the vehicle based on the signal strengths for the signals received from the plurality of transponders including a transponder for the part and based on the identification of the parts in the signals.

5. The method of claim 1, wherein the plurality of transponders comprises a plurality of radio frequency identifiers.

6. The method of claim 1, wherein the vehicle is selected from one of an aircraft, a ground vehicle, an automobile, a truck, a bus, a train, a ship, a submarine, and a spacecraft.

7. An apparatus comprising:
a storage device;
program code stored in the storage device; and
a processor unit configured
to run the program code to receive signals by a reader positioned at a number of locations on a path relative to a vehicle from a plurality of transponders associated with parts in the vehicle, the parts including a number of fixed parts and a number of unfixed parts with respect to the vehicle, the number of fixed parts including any part that has a location that cannot be changed in the vehicle and the number of unfixed parts including any part that is usable in more than one location in the vehicle;
to identify the parts from the identification of the parts in the signals;
to create a number of associations between each of said parts and a higher level assembly in which the part is used, the higher level assembly comprises a plurality of fixed parts having a known location;
to determine nearness index information between transponders to associate an unfixed part with a fixed part using signal strengths of the received signals; and
to form a map of the parts using a number of locations identified for the parts by identifying the known locations for the number of fixed parts and determining the locations of the number of unfixed parts, wherein the location of each of the unfixed parts is determined based upon a known location of a fixed part, the created number of associations, and said nearness index information associating an unfixed part with a fixed part.

8. The apparatus of claim 7, wherein the processor unit is further configured to run the program code to display the map of the parts on a display device.

9. The apparatus of claim 7 further comprising:
responsive to a removal of a part from a location in the vehicle, recording the removal of the part and the location using the locations identified for the parts.

10. The apparatus of claim 7, wherein the processor unit is further configured to run the program code to identify a location of the part in the vehicle based on the signal strengths for the signals received from the plurality of transponders including a transponder for a part and based on the identification of the parts in the signals in response to placing the part in the vehicle.

11. The apparatus of claim 7, wherein the plurality of transponders comprises a plurality of radio frequency identifiers.

12. The apparatus of claim 7, wherein the vehicle is selected from one of an aircraft, a ground vehicle, an automobile, a truck, a bus, a train, a ship, a submarine, and a spacecraft.

13. A computer program product for identifying parts in a vehicle comprising:
a non-transitory computer readable storage medium;
program code, stored on the computer readable storage medium, for receiving signals by a reader positioned at a number of locations on a path relative to a vehicle from a plurality of transponders associated with the parts in the vehicle, the parts including a number of fixed parts and a number of unfixed parts with respect to the vehicle, the number of fixed parts including any part that has a location that cannot be changed in the vehicle and the number of unfixed parts including any part that is usable in more than one location in the vehicle;
program code, stored on the computer readable storage medium, for identifying the parts from the identification of the parts in the signals;
program code, stored on the computer readable storage medium, for determining nearness index information between transponders to associate an unfixed part with a fixed part using signal strengths of said received signals;
program code, stored on the computer readable storage medium, for creating a number of associations between each of said parts and a higher level assembly in which the part is used, the higher level assembly comprises a plurality of fixed parts having a known location; and
program code, stored on the computer readable storage medium, for forming a map of the parts using a number of locations identified for the parts by identifying the known locations for the number of fixed parts and determining the locations of the number of unfixed parts, wherein the location of each of the unfixed parts is determined based upon a known location of a fixed part, the created number of associations, and said nearness index information associating an unfixed part with a fixed part.

14. The method of claim 1, wherein the locations on the path are positions around the vehicle.

15. The apparatus of claim 7, wherein the locations on the path are positions around the vehicle.

16. The computer program product of claim 13, wherein the locations on the path are positions around the vehicle.

17. The method of claim 1, further comprising generating the nearness index information using a statistical analysis applied to signal information.

* * * * *